June 27, 1933.  M. EXELMANS  1,916,169
LIGHTING APPLIANCE
Filed Jan. 23, 1931  3 Sheets-Sheet 1
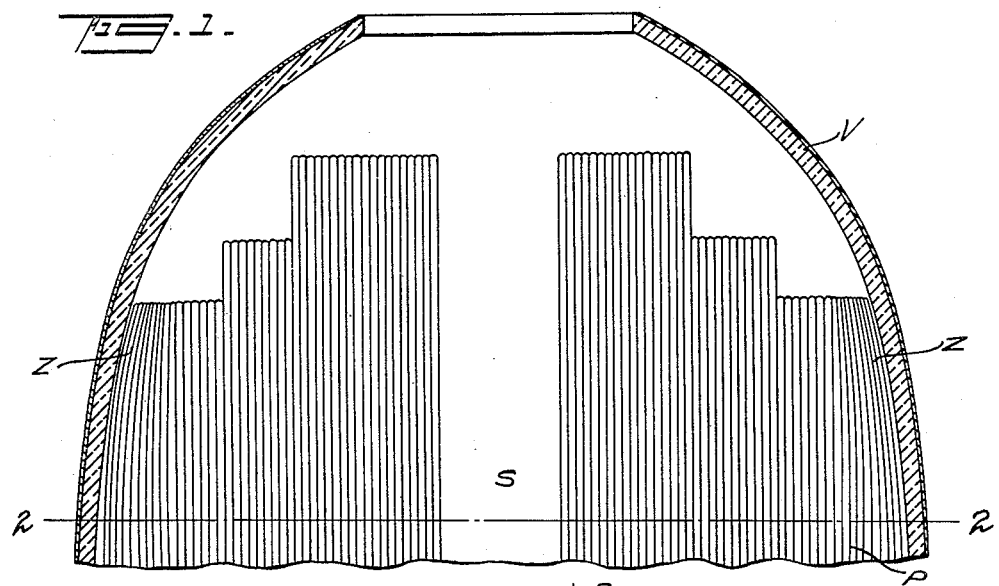
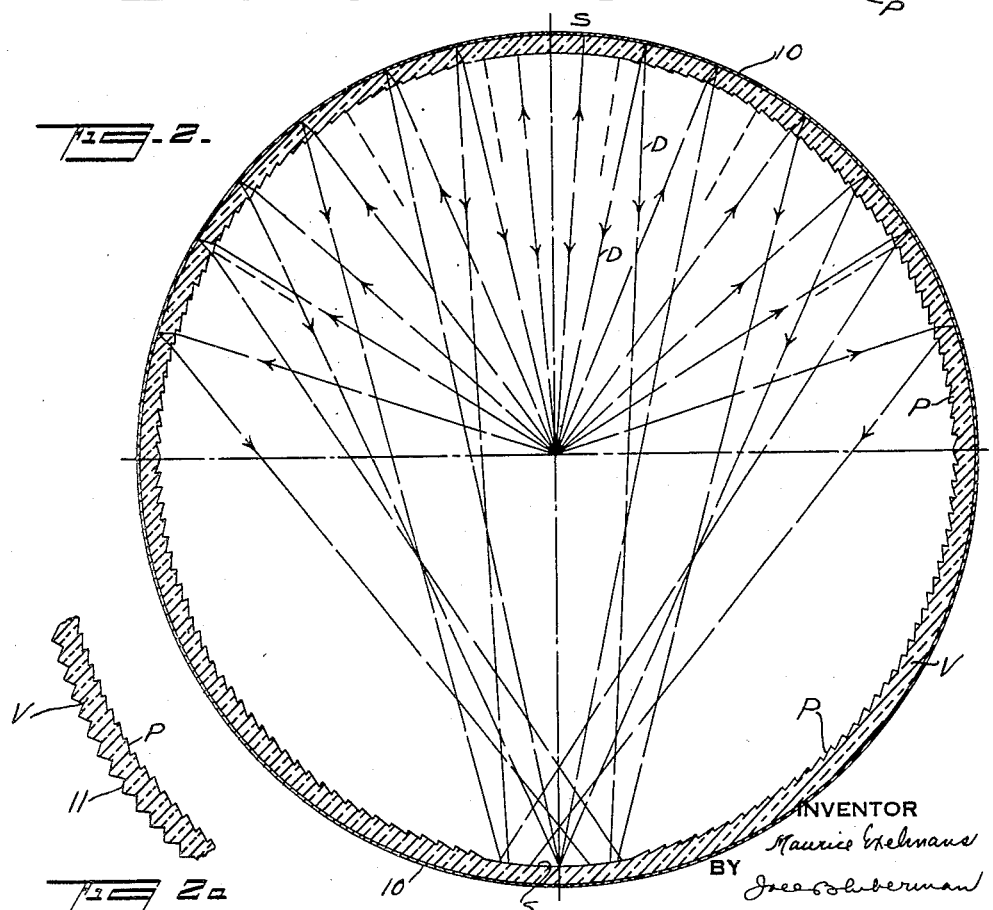

June 27, 1933.　　　　M. EXELMANS　　　　1,916,169
LIGHTING APPLIANCE
Filed Jan. 23, 1931　　　3 Sheets-Sheet 2
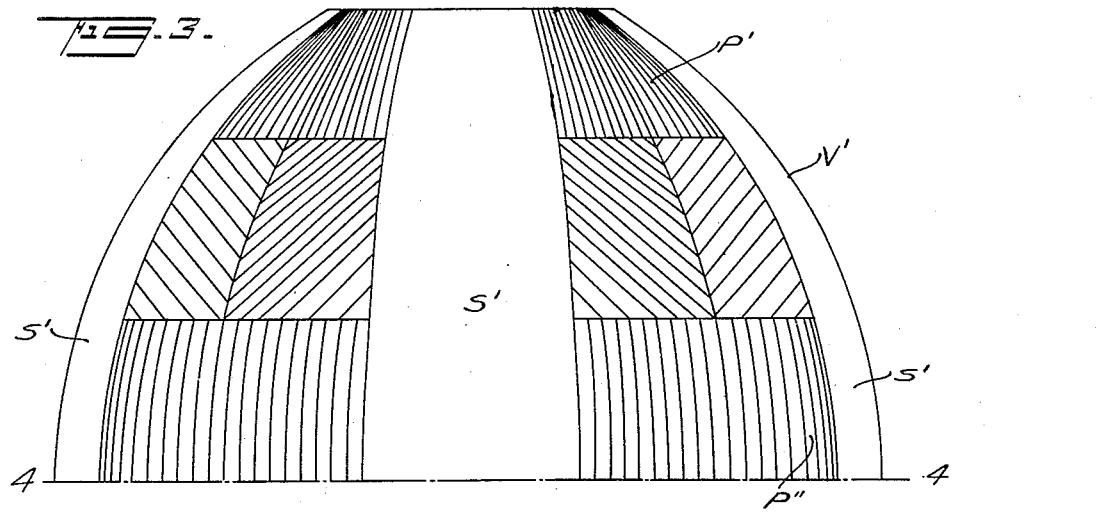
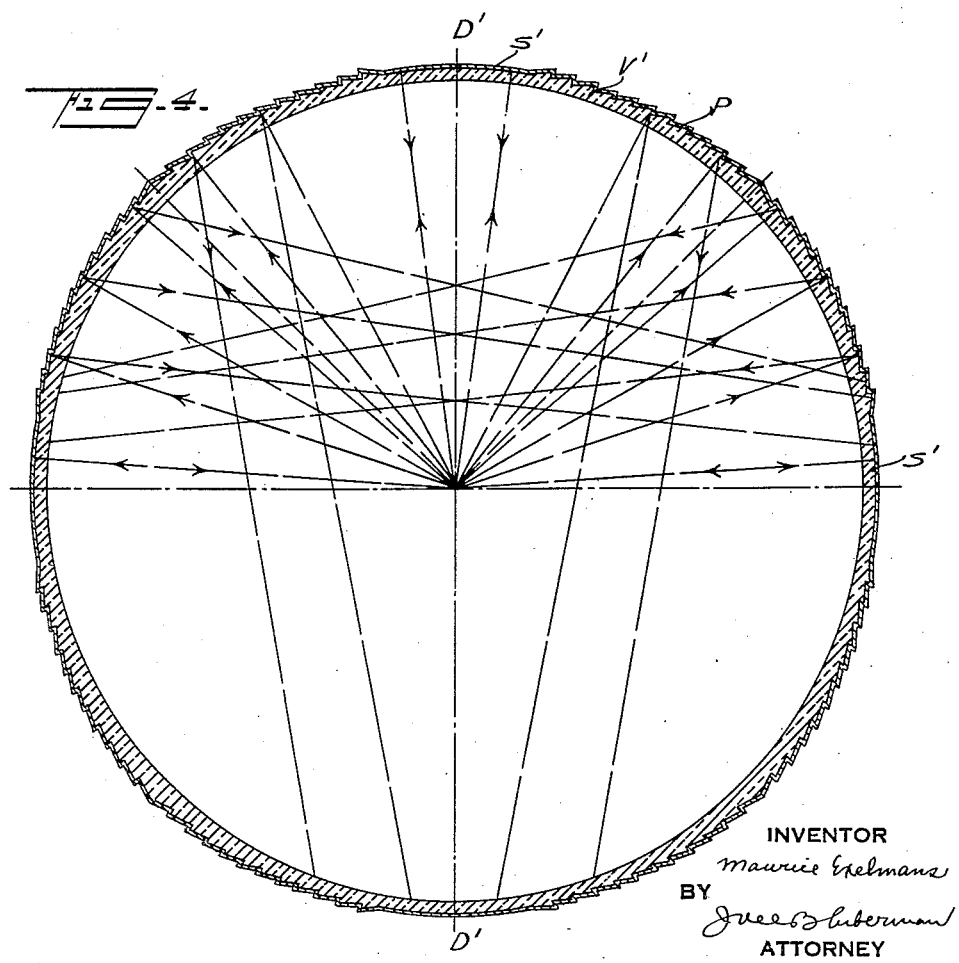
INVENTOR
Maurice Exelmans
BY
　　　　ATTORNEY

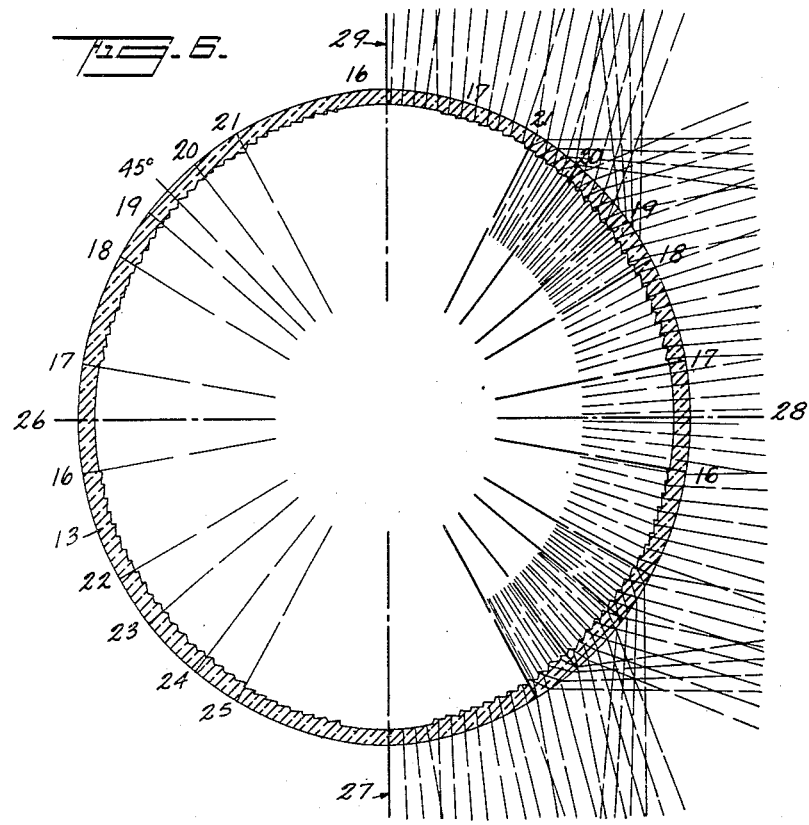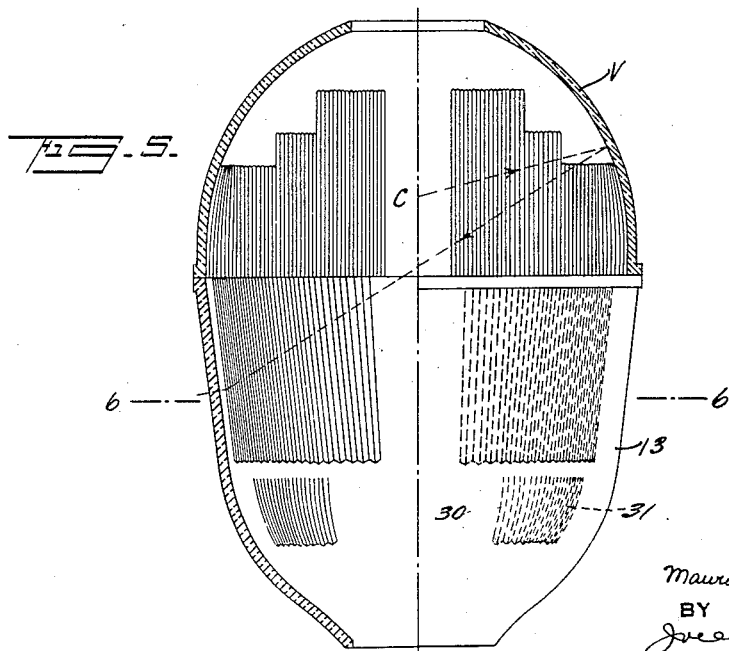

Patented June 27, 1933

1,916,169

UNITED STATES PATENT OFFICE

MAURICE EXELMANS, OF PARIS, FRANCE, ASSIGNOR TO HOLOPHANE COMPANY, INC., OF NEW YORK, N. Y., A CORPORATION OF DELAWARE

LIGHTING APPLIANCE

Application filed January 23, 1931, Serial No. 510,650, and in France February 24, 1930.

The present invention relates to improvements in lighting appliances for streets and other similar purposes.

The invention is designed to provide a lighting refractor giving different luminous intensities in different azimuths or planes passing through the axis of the apparatus for accentuating the lighting in certain principal directions.

A lighting apparatus more particularly for lighting streets has already been proposed comprising various combinations of glass with refracting prisms or of refractors and reflectors having the general objects given above, such as Dorey Patent No. 1,596,006. For example, to light the streets and their crossings in such a way as to transmit the greatest proportion of the luminous flux in useful directions, for instance the roadway and the least possible in these directions outside the roadway.

According to the present invention, the luminair employs a reflector having in the principal direction to be lit smooth sectors reflecting normally the rays emitted by the source and in the other sections or in certain of them, refracting prisms acting to deviate the rays received in the principal direction referred to above by superposing them or sending them out next to the rays reflected normally by the smooth sections.

This invention has for its object an apparatus of a similar nature and comprises a glass formation having at the same time the functions of refractor and reflector.

This glass as indicated above comprises reflecting and smooth sectors in each of the principal directions of lighting and is characterized by the fact that in its other sectors the external surface may act as a reflector while the refracting action is furnished by the prisms or corrugations formed on one or the other of the faces internal and external. The reflecting action at the external face may be obtained either by silvering that face or by providing prisms giving total reflection; in the last case it is understood the refracting prisms are formed on the internal surface; in the case of silvering, the refracting prisms may just as well be formed on the external surface as on the internal surface or on both.

The attached drawings show, by way of example, two examples embodying the invention in which the prismatic reflecting parts are divided into a number of sectors, each one consisting of a group of prisms of the same angle providing a partial light flux directed more or less toward the axis of the corresponding general direction, and illustrating the use of such reflector with an asymmetric refractor.

Figures 1 and 2 show respectively in axial cross section and horizontal cross section on the line 2—2 of Figure 1, a refractor reflector embodying the invention for two general directions of lighting, as for example, for streets in a straight line;

Figure 2a is a fragmentary sectional view showing a modification;

Figure 3 is an elevational view and Figure 4 is a horizontal cross section on the line 4—4 of Figure 3, of a glass reflector designed for lighting in four general directions, for example, for lighting a street crossing at 90°;

Figure 5 is a vertical sectional view through a street lighting refractor utilizing the cupola shaped dome of Figure 1; and Figure 6 is a horizontal sectional view on the line 6—6 of Figure 5.

In Figures 1 and 2 the glass V contains two reflecting smooth sectors S S at 180° from each other; the external face between these two sectors is silvered as indicated at 10. It may also be provided with prisms giving total reflection, as indicated at 11 in Figure 2a, so as to form a reflector. The internal face between the smooth sectors is also provided with refracting prisms P. The path of each ray is indicated before and after reflection. These prisms extend radially so that the reflected rays will be directed in the direction D D toward the smooth sectors S, but are depressed so as to pass below, as shown in Figure 5.

In Figures 3 and 4 the glass V' consists of four transparent smooth reflecting sectors S' at 90° with one another; the external faces between these smooth sectors are provided with prisms P' P' and the outer surface is silvered to insure reflection of the light and at the same time its deviation in such a way that the refracted rays will be directed in the directions D' D' across the smooth sectors S'. The inner surface is shown entirely smooth but it may be composed between the sectors S' of prisms or corrugations to act upon those light rays which may not be sufficiently deviated by the exterior prisms P'.

In all these methods of carrying out the invention the prisms or corrugations or a part of them may be arranged more or less inclined to the meridians as shown at P' in Figure 3 instead of vertically in order to increase or diminish the deviation of the incident rays in the horizontal plane or in the vertical plane or in both.

Preferably the prismatic zones will be subdivided into groups of prisms each consisting of a certain number of prisms of the same angle and each adapted to form a partial light flux delivered more or less in the principal directions.

The apparatus may generally have a cylindrical form but may nevertheless have a non-symmetrical form adapted to give by itself a non-symmetrical distribution to the light which will complete or correct the action on the light prisms and corrugations. As to the form in axial section the glass enclosure may have the general form of a cupola or half globe surrounding the light source toward the top, and it may serve as a reflector in combination with a refractor or a band refractor.

In Figures 5 and 6 the apparatus consists of a piece of prismatic glassware 13 combined with a reflector V. The light source may be placed at C so that all light rays passing directly to the prismatic glass 13 will be at useful angles below the horizontal. The light rays emanating from the source towards the reflector will be returned thereby into the most useful prismatic portion of glassware 13.

This glassware 13, as indicated in Figure 6, has four smooth sectors such as 16—17 at 90°, and with the usual width to permit light coming directly from the source as well as that reflected by reflector V to be emitted without lateral deviation. In the spaces between these smooth sectors various prismatic sectors 17—18, 18—19, 19—20, 20—21 are inserted for the purpose of providing effective illumination of the street, as discussed in the Dorey patent above referred to. In the portion under the vertical prisms 17—21, the glassware 13 is provided with four smooth sectors 30 and prisms 31.

If the reflector C be symmetrical in function with reference to the vertical axis then the reflected light rays will follow the same general lateral course as the direct light and as shown in Figures 6. If the reflector be of either design shown in Figures 1 to 4 inclusive, it will preferably be placed so that the smooth sectors S, Figure 2, or S', Figure 4, register with the smooth sectors 16—17, Figure 6. The reflected light will then be more concentrated laterally when delivered to the refractor than is the case with the direct light and will be emitted from the refractor in converging directions across the axes 26—28, 27—29, Figure 6, while the direct light is emitted from the refractor in slightly divergent directions. This introduces a desirable element of limited diffusion in the resultant beams which is especially useful in smoothing out any irregularities in the illumination due to irregularities in the form of the light source. In cases where the light is to be separated laterally into two or three beams the use of asymmetric reflectors of the form described will also result in saving light for the useful beams which cannot be given sufficient lateral redirection if the construction be used of the above mentioned patent.

It should be understood that the number and relative disposition of the smooth sectors, that is to say, the principal directions of lighting may vary at will to meet the needs of lighting; also the form and the distribution of the prismatic sectors and the deviations imposed by them on the light flux may be varied in many ways without exceeding the scope of this invention.

What is claimed is:

1. A dome shaped reflector for enclosing light sources having a plurality of smooth reflecting zones separated by reflecting prismatic zones, the prismatic reflecting zones being arranged to collect widely divergent light and concentrate it into a predetermined number of general directions corresponding with the directions of the light reflected by the smooth zones, the reflector having an opening to permit the reflected light to pass through.

2. In a luminair, a dome shaped reflector mounted about a vertical axis and a light source mounted on said axis, the reflector having smooth reflecting sections extending toward zenith separated by prismatic refracting and reflecting sections adapted to reflect light into the same general directions as the smooth sections.

3. In a luminair a dome shaped reflector mounted about a vertical axis and a light source mounted on said axis, the reflector having smooth reflecting zones opposite one another and adapted to reflect light from the light source to cause it to pass underneath the reflector and in a beam below the opposite smooth sector, and prismatic reflecting and refracting sections between the smooth sections for acting on light from the light source to return it below the reflector in the same general direction as the rays from the smooth section.

4. A luminair as in claim 3, having a lower asymmetric refractor having smooth sectors receiving the reflected light and transmitting it.

5. A luminair comprising a light source, an asymmetric refractor in the form of a glass band disposed below the light source and having prisms for distributing light in different azimuths, and transmitting sections for passing direct light in the same general directions, and an asymmetric reflector above the refractor and about the light source for reflecting light into the refractor in the same general directions as the light distributed by the refractor, the reflected light being slightly convergent and being so transmitted by the refractor.

6. A luminair comprising, a light source, a refractor having prisms for distributing light in different azimuths separated by smooth sections for passing direct light which is slightly divergent, and a reflector for acting on light from the light source to concentrate it in convergent beams upon the smooth sections of the refractor for transmission thereby in convergent directions whereby the beams cross to produce limited diffusion.

7. A luminair comprising a light source and a reflector provided at its outer surface with reflecting means oblique to incident light for effecting reflection of the light and refracting prisms for altering the direction of the emitted light into planes lateral of the planes of the light source and incident beams.

8. A luminair as in claim 7 characterized in that the refracting prims are on the inside of the reflector.

9. A luminair as in claim 7 characterized in that the refracting prisms are on the outside of the reflector.

10. A luminair as in claim 7 characterized in that the refracting prisms are radial.

11. A luminair as in claim 7 wherein the reflecting means comprises external silvering.

12. A luminair as in claim 7 wherein the reflecting means comprises external prisms.

13. A luminair comprising a light source and reflector, the reflector having means for reflection provided at its outer surface and having smooth sectors between sectors carrying refracting prisms which combined with the reflecting means are adapted to direct light in the same general direction as light reflected from the smooth sectors.

14. A luminair as in claim 13 wherein the smooth sectors are substantially 180° apart to produce two beams substantially 180° to one another.

15. A luminair as in claim 13 wherein the smooth sectors are substantially 90° apart to produce four beams substantially 90° to one another.

16. A luminair as in claim 13 wherein the refracting prisms are arranged in groups, the prisms of each group being of the same angle.

17. A luminair comprising a light source covered by a reflector extending below the light center and a refractor closing the bottom opening of the reflector, the reflector being adapted to produce a redistribution of light in vertical planes and direct the reflected light toward the refractor and the refractor being adapted to produce a redistribution of light in horizontal directions without materially changing the distribution in vertical planes given by the reflector.

18. A luminair as in claim 17, characterized in that the reflector has external reflecting means on its outer surface and prisms at the inner surface for producing refraction of the reflected light in horizontal directions.

19. A luminair as in claim 17 characterized in that the reflector has prismatic sectors adapted to produce an asymmetric distribution of light and the refractor has refracting prisms for producing a similar asymmetric distribution of light.

20. A luminair as in claim 17 characterized in that the refractor has smooth sectors for direct transmission of light and prisms on opposite sides of the smooth sectors for redistributing light incident thereon into the same general direction as the directly transmitted light, and the reflector has smooth reflecting sectors between sectors carrying refracting prisms which combined with external reflecting means are adapted to redirect light in the same general direction as the light reflected from the smooth sectors, the reflector being so placed relative to the refractor that the reflected light is transmitted across the axis of the luminair toward the opposite smooth sector of the refractor.

Signed at Paris, France, this 12 day of janvier, 1931.

MAURICE EXELMANS.